US012700240B2

(12) United States Patent
Tsai et al.

(10) Patent No.: US 12,700,240 B2
(45) Date of Patent: Aug. 4, 2026

(54) ELECTRONIC DEVICE FOR ASSISTING DRIVER IN RECORDING IMAGES, AND IMAGE PROCESSING METHOD AND NON-TRANSIENT COMPUTER READABLE RECORDING MEDIUM THEREOF

(71) Applicant: COMPAL ELECTRONICS, INC., Taipei (TW)

(72) Inventors: Wen-Ting Tsai, Taipei (TW); Li-Ting Huang, Taipei (TW); Fu-Chen Hsu, Taipei (TW); Yang-Zheng Ou, Taipei (TW); Wei-Jun Wang, Taipei (TW); Ming-Hsien Wu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 130 days.

(21) Appl. No.: 18/890,795

(22) Filed: Sep. 20, 2024

(65) Prior Publication Data

US 2025/0131731 A1 Apr. 24, 2025

Related U.S. Application Data

(60) Provisional application No. 63/600,038, filed on Nov. 17, 2023, provisional application No. 63/544,956, filed on Oct. 20, 2023.

(51) Int. Cl.
*G06V 20/56* (2022.01)
*G06T 3/40* (2024.01)
(Continued)

(52) U.S. Cl.
CPC ................ *G06V 20/56* (2022.01); *G06T 3/40* (2013.01); *G06T 5/50* (2013.01); *G06T 5/70* (2024.01);
(Continued)

(58) Field of Classification Search
CPC .. G06V 20/56; G06T 3/40; G06T 5/50; G06T 5/70; G06T 2207/20132;
(Continued)

(56) References Cited

U.S. PATENT DOCUMENTS 11,003,931 B2 * 5/2021 Wang .................. G06V 20/597
2015/0221341 A1 * 8/2015 Akay .................. H04N 9/8205
386/278
(Continued)

*Primary Examiner* — Padma Haliyur

(57) ABSTRACT

An electronic device for assisting driver in recording images is introduced. In the electronic device, a panoramic camera unit is installed on a transportation vehicle to capture an initial video. A positioning unit detects a real-time location of the transportation vehicle. A database stores scenic spot information including multiple scenic spot locations. An intelligence processing unit receives the initial video and uses artificial intelligence to identify a user's image and an image of the scenic spot to be locked at the scenic spot location. The intelligence processing unit receives the real-time location and determines the direction of travel. The intelligence processing unit reads the scenic spot information and determines a viewing range of the transportation vehicle entering the scenic spot location based on the real-time location and the direction of travel to capture a time period within the viewing range from the initial video and crop a recorded video.

18 Claims, 10 Drawing Sheets

(51) Int. Cl.
    *G06T 5/50*        (2006.01)
    *G06T 5/70*        (2024.01)
    *H04N 23/61*      (2023.01)
    *H04N 23/698*    (2023.01)

(52) U.S. Cl.
    CPC .......... *H04N 23/61* (2023.01); *H04N 23/698*
         (2023.01); *G06T 2207/20132* (2013.01); *G06T*
                       *2207/20221* (2013.01)

(58) Field of Classification Search
    CPC .......... G06T 2207/20221; H04N 23/61; H04N
               23/698; H04N 23/64; H04N 5/91; H04N
                                  23/57
    See application file for complete search history.

(56)                  References Cited

U.S. PATENT DOCUMENTS

| | | | |
|---|---|---|---|
| 2019/0014260 A1* | 1/2019 | Mu | G06T 3/18 |
| 2021/0374967 A1* | 12/2021 | Ramanathan | G06T 7/194 |
| 2021/0375135 A1* | 12/2021 | Yang | H04W 4/029 |
| 2022/0020162 A1* | 1/2022 | Murashkin | G06V 10/443 |
| 2022/0027656 A1* | 1/2022 | Jia | G06T 7/55 |
| 2022/0368826 A1* | 11/2022 | Gerrese | G06F 16/53 |
| 2023/0037777 A1* | 2/2023 | Sun | G08G 1/148 |
| 2023/0169580 A1* | 6/2023 | Hauk | G06F 16/51 |
| | | | 705/26.1 |
| 2025/0131766 A1* | 4/2025 | Tsuji | G06V 10/98 |

* cited by examiner (Sunrise – time range between
06:10 and 06:25)

East     South

North     West

Si

11

UI

T

Time period

00:45:00    00:40:00    00:35:00    00:30:00

Video time

Si

UI

10

Ia2        Ia1

ELECTRONIC DEVICE FOR ASSISTING DRIVER IN RECORDING IMAGES, AND IMAGE PROCESSING METHOD AND NON-TRANSIENT COMPUTER READABLE RECORDING MEDIUM THEREOF

CROSS-REFERENCE TO RELATED APPLICATION

This non-provisional application claims priority under 35 U.S.C. § 119(e) on U.S. provisional Patent Application No. 63/544,956 filed on Oct. 20, 2023, and on U.S. provisional Patent Application No. 63/600,038 filed on Nov. 17, 2023, the entire contents of which are hereby incorporated by reference.

BACKGROUND OF THE INVENTION

1. Field of the Invention

The present disclosure relates to a technique for assisting a driver in recording images, and in particular to an electronic device for assisting a driver in recording images, and an image processing method and a non-transitory computer-readable storage medium thereof.

2. Description of the Related Art

In current motorcycle riding experience services, a common camera (for example, capable of imaging only in viewing angles of the front and the back of a route of travel) is usually used for manual image capturing or image capturing of fixed routes. The approach above provides limited acquirable viewing angles for image capturing, and cannot meet the recording needs of different riders. When a transportation vehicle travels on a drive lane and passes through a scenic spot, due to the speed of the transportation vehicle, road conditions, on-site conditions and that both hands of a rider need to focus on motorcycle handles, it is not feasible for the rider to freely record the passing sceneries by means of manual image capturing.

Moreover, if image capturing is performed in an external means by a 360-degree panoramic camera mounted on a transportation vehicle in current motorcycle riding experience services, more image capturing angles can be achieved, for example, sceneries on both sides and the behind a motorcycle can be further captured. However, to use such 360-degree panoramic camera to capture a panoramic video or images, a rider is required to post-produce and edit the video or images, and the acquired video or images can appear rather bland if the rider has limited abilities for such post-production and editing.

Therefore, it is an object of the present disclosure to provide a solution for solving the above issues of the prior art.

BRIEF SUMMARY OF THE INVENTION

To solve the issues above, the applicant provides an electronic device for assisting a driver in recording images, and an image processing method and a non-transitory computer-readable recording medium thereof capable of automatically capturing images according to a predetermined setting of a user during a process of riding, and generating an optimal recorded video by means of artificial intelligence processing, thereby providing more customized riding experience services.

To achieve the objects above, the present disclosure provides an electronic device for assisting a driver in recording images. The electronic device is adapted to assist a user in recording images during a usage process of a transportation vehicle, and includes: a panoramic camera unit, installed on a transportation vehicle to capture an initial video presenting a panoramic image of a location of the transportation vehicle; a positioning unit, detecting a real-time location of the transportation vehicle; a database, storing scenic spot information including of multiple scenic spot locations; and an intelligence processing unit, electrically connected to the panoramic camera unit to receive the initial video, identifying an image of the user by means of artificial intelligence, and identifying an image of a scenic spot to be locked at the scenic spot location. The intelligence processing unit is further electrically connected to the positioning unit to receive the real-time location, and determines a direction of travel. The intelligence processing unit is further electrically connected to the database to read the scenic spot information, determines, according to the real-time location and the direction of travel, a viewing range of the transportation vehicle entering one of the scenic spot locations so as to capture a time period of the transportation vehicle within the viewing range from the initial video, and crops a recorded video with the image of the user and the image of the scenic spot as a compositional subject according to the time period.

In one embodiment, the intelligence processing unit includes an image capturing module, and captures a first image region where the image of the user is located and a second image region where the image of the scenic spot is located from the initial video by the image capturing module. The recorded video is a composite image locked with the first image region and the second image region, and includes only the image of the user currently using the transportation vehicle and the image of the scenic spot.

In one embodiment, the intelligence processing unit includes an image post-production module. The image post-production module automatically performs image post-production on the recorded video by means of artificial intelligence, wherein the image post-production includes scaling, position balancing and/or noise removal.

In one embodiment, when the transportation vehicle enters the viewing range and the user leaves the transportation vehicle, the image capturing module identifies by means of artificial intelligence the image of the scenic spot to be locked in the initial video, at the same time identifies and tracks the image of the user, and when the user is at a viewing position with respect to the image of the scenic spot and matches the compositional subject, automatically finds a view in an image corresponding to a current time and captures a selected picture from the initial video.

The present disclosure further provides an electronic device for assisting a driver in recording images. The electronic device is adapted to assist a user in recording images during a usage process of a transportation vehicle, and includes: a panoramic camera unit, installed on a transportation vehicle to capture an initial video presenting a panoramic image of a position of the transportation vehicle; a positioning unit, detecting a real-time location of the transportation vehicle currently used by the user; a database, storing solar information including a sunrise time and/or a sunset time; and an intelligence processing unit, electrically connected to the panoramic camera unit to receive the initial video, identifying an image of the user by means of artificial intelligence, and identifying an image of the sun. The intelligence processing unit is further electrically connected to the positioning unit to receive the real-time location of the transportation vehicle, and determines a direction of travel. The intelligence processing unit is further electrically connected to the database to read the solar information, and captures a time period of a time range of the sunrise time and/or the sunset time within the time range from the initial video according to the real-time location of the transportation vehicle and the direction of travel, and crops a recorded video with the image of the user and the image of the sun as a subject according to the time period.

In one embodiment, the intelligence processing unit includes an image capturing module, and captures a first image region where the image of the user is located and a second image region where the image of the sun is located from the initial video by the image capturing module. The recorded video is an image composition locked with the first image region and the second image region, and includes only the image of the user currently using the transportation vehicle and the image of the sun.

In one embodiment, the intelligence processing unit includes an image post-production module. The image post-production module automatically performs image post-production on the recorded video by means of artificial intelligence, wherein the image post-production includes scaling, position balancing and/or noise removal.

In one embodiment, the solar information includes a position defined of the sun by an elevation angle and an azimuth angle, and the intelligence processing unit calculates a position of the sun in the initial video within the time range of the sunrise time and/or the sunset time according to the elevation angle and the azimuth angle of the position of the sun, so as to obtain the image of the sun.

In one embodiment, the intelligence processing unit identifies a position of the sun in the initial video within the time range of the sunrise time and/or the sunset time according to brightness in the initial video, so as to obtain the image of the sun.

The present disclosure further provides an image processing method for assisting a driver in recording images. The image processing method is performed by an electronic device reading an executable code, and is adapted to assist a user in recording images during a usage process of a transportation vehicle. The image processing method includes the following steps: image capturing of capturing an initial video presenting a panoramic image of a position of the transportation vehicle; positioning detection of detecting a real-time location of the transportation vehicle and determining a direction of travel; image identification of identifying an image of the user by means of artificial intelligence, and reading scenic spot information of a scenic spot location from a database to identify an image of a scenic spot to be locked at the scenic spot location; and recorded video generation of determining, according to the real-time location and the direction of travel, a viewing range of the transportation vehicle entering the scenic spot so as to capture a time range when the transportation vehicle is in the viewing range, and cropping a recorded video with the image of the user and the image of the scenic spot as a compositional subject according to the time range.

In one embodiment, in the step of recorded video generation, a first image region where the image of the user is located is captured and a second image region where the image of the scenic spot is located is captured from the initial video, wherein the recorded video is an image composition locked with the first image region and the second image region, and includes only the image of the user currently using the transportation vehicle and the image of the scenic spot.

In one embodiment, when the transportation vehicle enters the viewing range and the user leaves the transportation vehicle, the step of image identification includes identifying by means of artificial intelligence the image of the scenic spot to be locked in the initial video, at the same time identifying and tracking the image of the user, and when the user is at a viewing position with respect to the image of the scenic spot and matches the compositional subject, automatically finding a view in an image corresponding to a current time and capturing a selected picture from the initial video.

The present disclosure further provides an image processing method for assisting a driver in recording images. The image processing method is performed by an electronic device reading an executable code, and is adapted to assist a user in recording images during a usage process of a transportation vehicle. The image processing method includes the following steps: image capturing of capturing an initial video presenting a panoramic image of a position of the transportation vehicle; positioning detection of detecting a real-time location of the transportation vehicle and determining a direction of travel; image identification of identifying an image of the user by means of artificial intelligence, and reading a sunrise time and/or a sunset time from a database to identify an image of the sun at sunrise and/or at sunset; and recorded video generation of capturing a time period of a time range of the sunrise time and/or the sunset time within the time range from the initial video, and cropping a recorded video with the image of the user and the image of the sun as a compositional subject according to the time period.

In one embodiment, in the step of recorded video generation, a first image region where the image of the user is located is captured and a second image region where the sun is located is captured from the initial video, wherein the recorded video is an image composition locked with the first image region and the second image region, and includes only the image of the user currently using the transportation vehicle and the image of the sun.

In one embodiment, the solar information includes a position of the sun defined by an elevation angle and an azimuth angle, and in the step of image identification, a position of the sun in the initial video within the time range of the sunrise time and/or the sunset time is calculated according to the elevation angle and the azimuth angle of the position of the sun, so as to obtain the image of the sun.

In one embodiment, in the step of image identification, a position of the sun in the initial video within the time range of the sunrise time and/or the sunset time is identified according to brightness in the initial video, so as to obtain the image of the sun.

The present disclosure further provides a non-transitory computer-readable recording medium for the method above. The non-transitory computer-readable recording medium stores a program having a plurality of executable codes for an electronic device to perform the method above when the executable codes are read by the electronic device.

Thus, by performing the image processing method above, the electronic device of the present disclosure can satisfy recording requirements of different users, and can freely record, according to predetermined scenery information, sceneries that a user passes by, thereby providing the user with customized riding experience services. Moreover, with image post-production performed on the recorded video by the image post-production module by means of artificial intelligence, the present disclosure further achieves effects of more comprehensive and enriched optimum pictures.

DETAILED DESCRIPTION OF THE INVENTION

Figure 1:
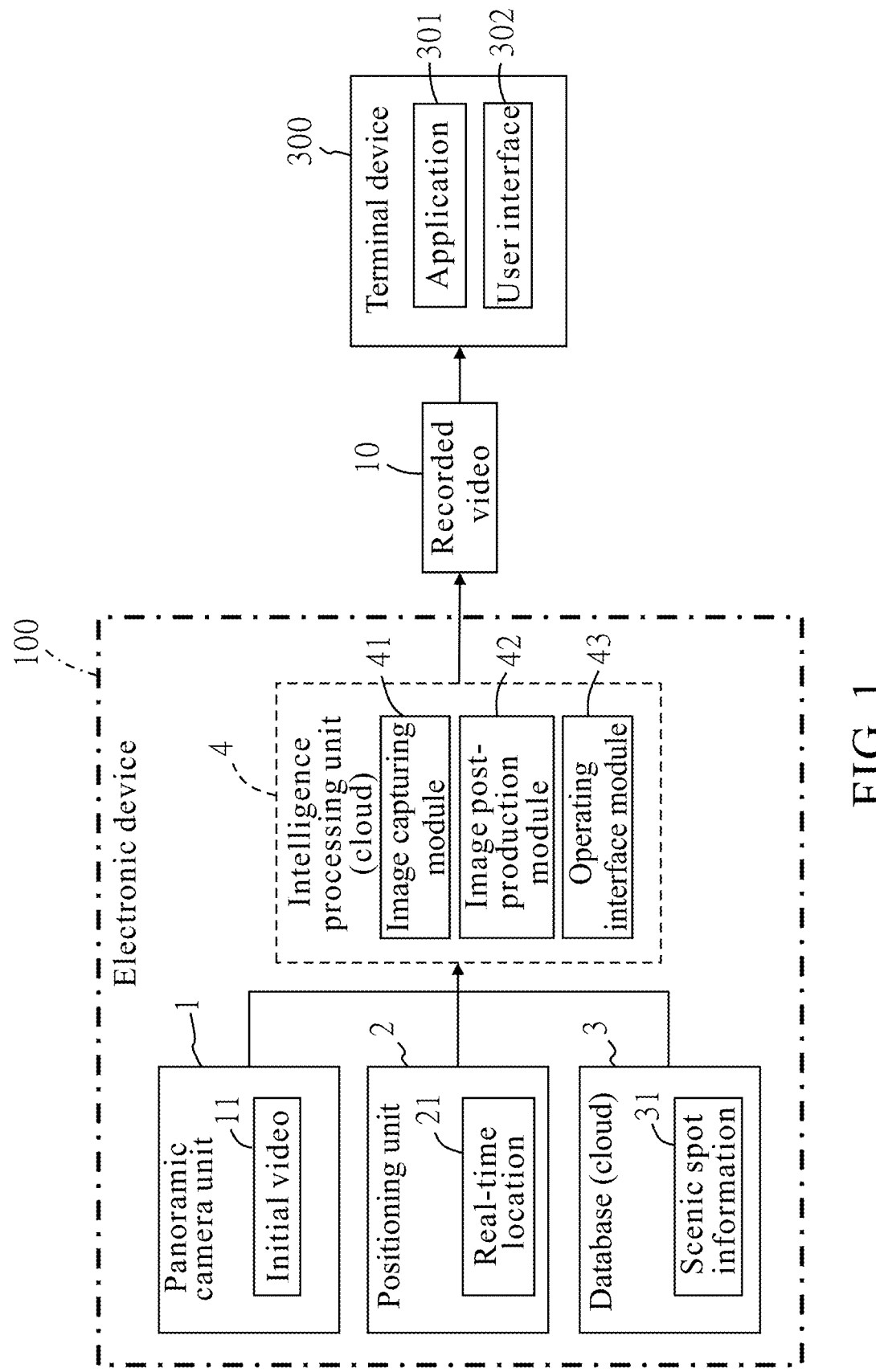
FIG. 1 is a system block diagram of an electronic device for assisting a driver in recording images according to a specific embodiment of the present disclosure.

To facilitate understanding of the object, characteristics and effects of this present disclosure, embodiments together with the attached drawings for the detailed description of the present disclosure are provided.

Referring to FIG. 1 to FIG. 11, the present disclosure provides an electronic device 100 for assisting a driver in recording images, an image processing method 200, and a non-transitory computer-readable storage medium. A transportation vehicle T below is primarily described by taking a land vehicle (an automobile and/or a motorcycle) as an example; however, the present disclosure is not limited to the example above. The electronic device 100 of the present disclosure has a transmission function of externally transmitting a recorded video 10, and can transmit the recorded video 10 to a terminal device 300. The transportation vehicle T described in all the embodiments below is provided with the electronic device 100 and is thus operable to perform the image processing method 200.

The terminal device 300 can be a device connectable to the electronic device 100 in a wired or wireless manner by the Internet, and is for example, a smartphone, a tablet computer or a laptop computer. The terminal device 300 is mounted with an application 301, and becomes communicatively connected to the electronic device 100 by executing the application 301. The terminal device 300 provides a user interface 302 while executing the application 301, and a user can perform the image processing method above via the user interface 302.

Figure 3B:
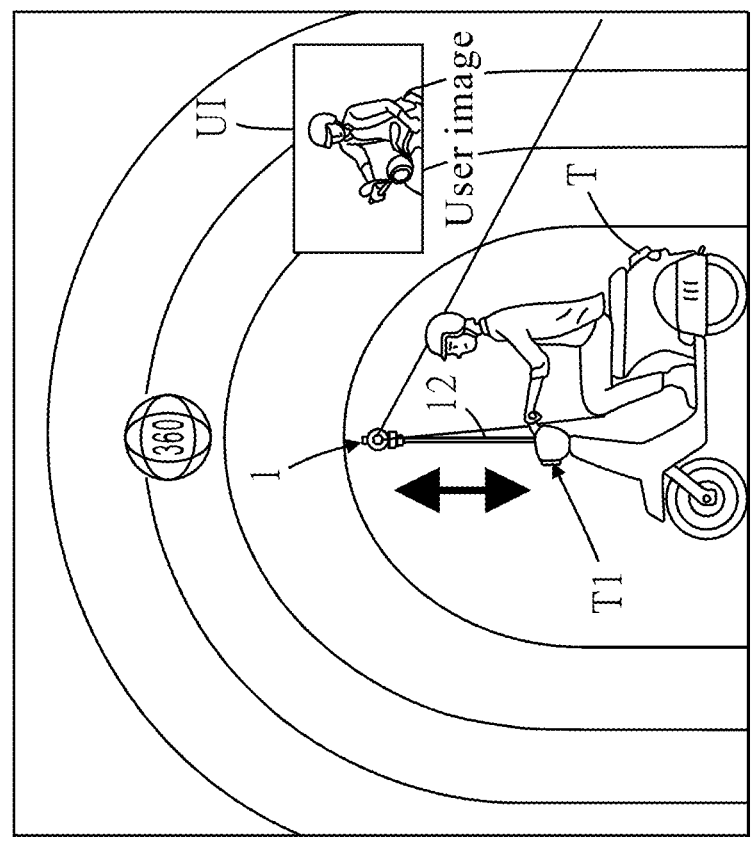
FIG. 3A and FIG. 3B are schematic diagrams of configurations and image capturing of an electronic device of the present disclosure and a transportation vehicle.
Figure 3A:
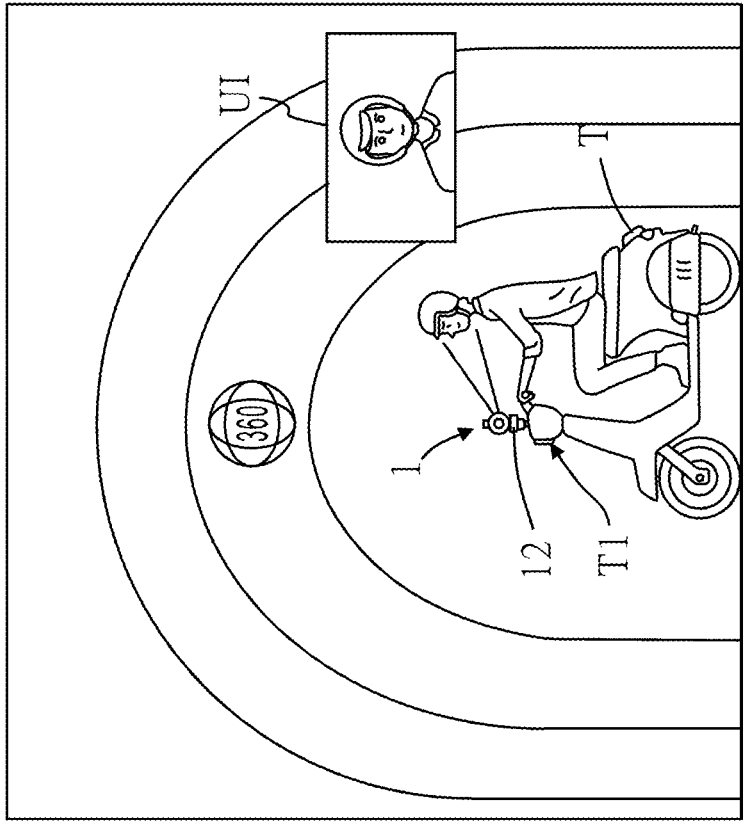
Figure 4:
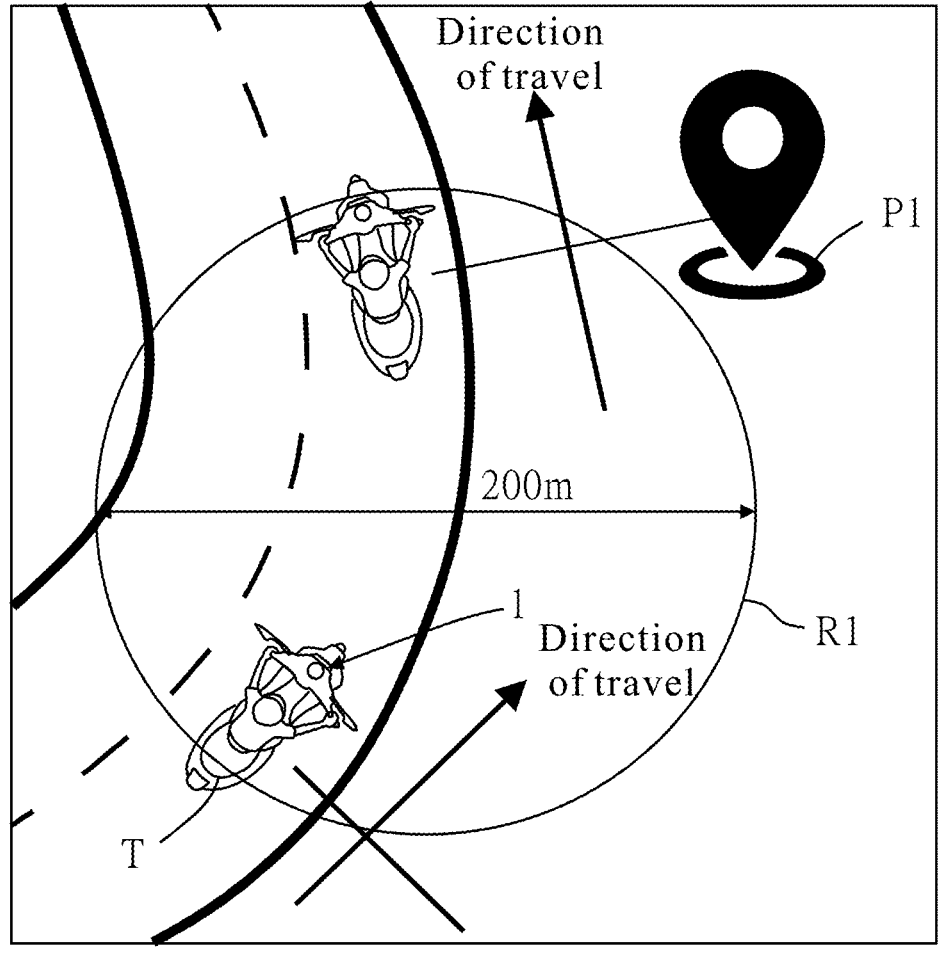
FIG. 4 is a schematic diagram of a viewing range when a transportation vehicle passes by a scenic spot location according to a first embodiment of the present disclosure.
Figure 5:
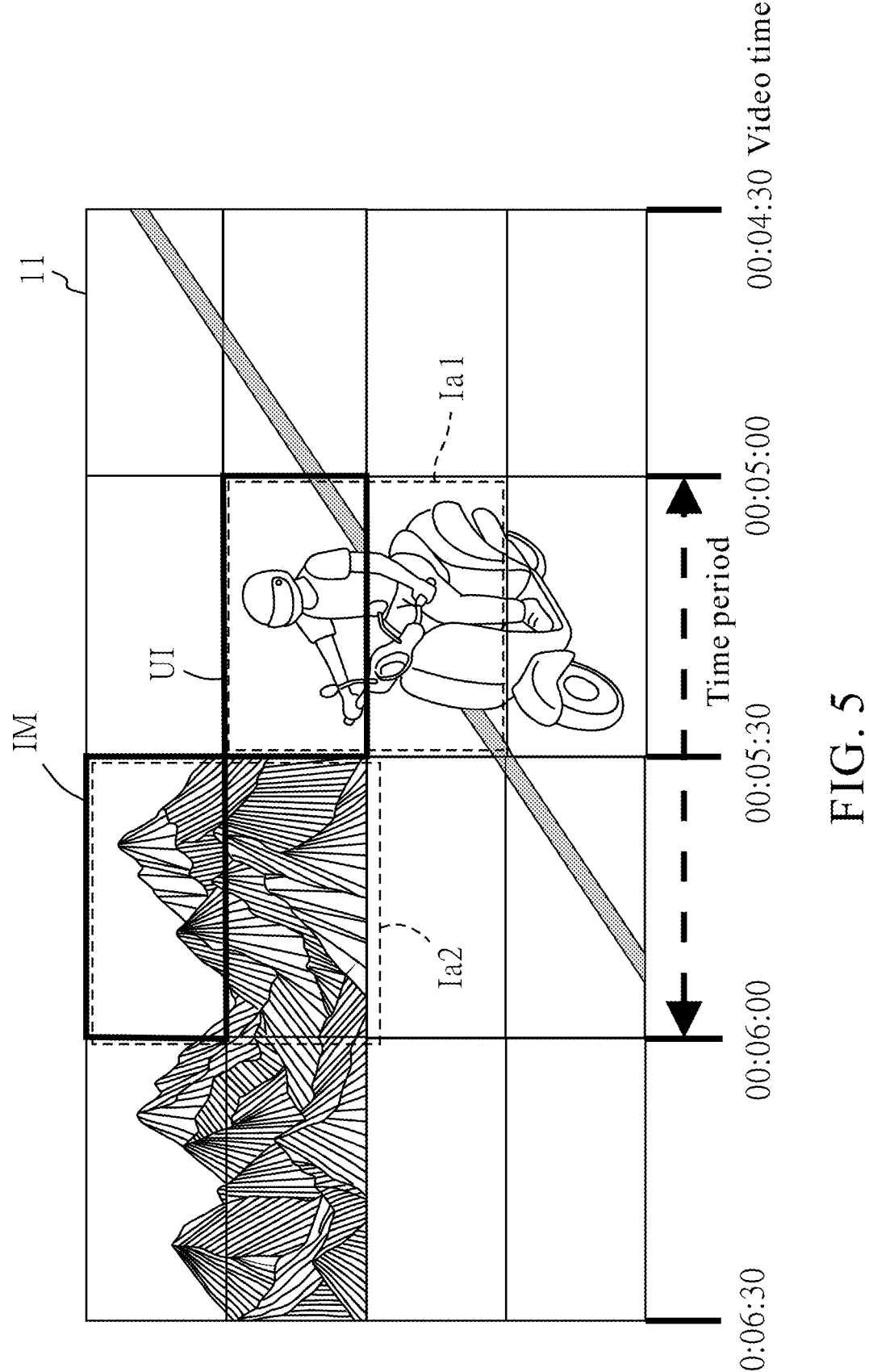
FIG. 5 is a schematic diagram of an initial video captured by an electronic device when a transportation vehicle enters a viewing range according to the first embodiment of the present disclosure.

The electronic device 100 is adapted to assist a user in recording images (including images of getting off the vehicle instead of being limited to only images during riding/driving) during a usage process of the transportation vehicle T, and includes a panoramic camera unit 1, a positioning unit 2, a database 3, and an intelligence processing unit 4. As shown in FIG. 3A and FIG. 3B, the panoramic camera unit 1 is, for example, a fish-eye camera capable of 360-degree panoramic image capturing, includes a telescopic element 12 (referring to FIG. 3A) with an adjustable height, and is disposed at a head T1 (alternatively, disposed at a tail) of the transportation vehicle T. The telescopic element 12 is operable to increase a height of the panoramic camera unit 1 so as to change a position of a viewing angle of the panoramic camera unit 1 and a height for capturing an image of an object. The user can adjust a height of a lens by means of the telescopic element 12 when needed. The panoramic camera unit 1 is installed on the transportation vehicle T to capture an initial video 11 (referring to FIG. 5). The initial video 11 is raw data, and presents a panoramic image of a location of the transportation vehicle T. The positioning unit 2 is operable to detect a real-time location 21 of the transportation vehicle T. The database 3 stores scenic spot information 31 including multiple scenic spot locations (for example, a user-predefined scenic spot list) The database 3 and the intelligence processing unit 4 can be located at a local end or at a cloud, the database 3 can be a cloud database and/or a local database, and the intelligence processing unit 4 can be a cloud server and/or a local server. The database 3 and the intelligence processing unit 4 are located at a cloud for example herein; however, the present disclosure is not limited to the examples above.

The positioning unit 2 can be, for example but not limited to, a Global Positioning System (GPS) operable to obtain directions and speeds. The positioning unit 2, for example, further includes a six-axis sensor, an electric motor output sensor, a (steering column) steering sensor, and a wireless communication module (5G) (for auxiliary use for GPS). The six-axis sensor is operable to determine a direction and a speed of travel of a transportation vehicle. The electric motor output sensor is operable to determine an acceleration of a transportation vehicle. The steering column steering sensor is operable to determine a steering angle of a transportation vehicle. The wireless communication module is operable to transmit images and data to a cloud server.

The intelligence processing unit 4 is electrically connected to the panoramic camera unit 1 to receive the initial video 11, and identifies, from the initial video 11 by means of artificial intelligence, a user image UI (for example, an image of the user to be identified by artificial intelligence) and a scenic spot image IM (for example, an image of the Jade Mountain) to be locked at a scenic spot location P1. The intelligence processing unit 4 is electrically connected to the positioning unit 2 to receive the real-time location 21, and determines a direction of travel. The intelligence processing unit 4 is further electrically connected to the database 3 to read the scenic spot information 31, determines according to the real-time location 21 and the direction of travel whether the transportation vehicle T enters a viewing range R1 (referring to FIG. 4) of the scenic spot location P1 so as to capture a time period (referring to FIG. 5) of the transportation vehicle T entering the scenic spot range R1 from the initial video 11, crops a recoded video 10 (referring to FIG. 6A, or for example, a selected video of a hot-spot scenic spot during riding of the user) with the user image UI and the scenic spot image IM as a compositional subject according to the time period, and transmits the recorded video 10 to the terminal device 300 for the user to view. It should be noted that, the means for cropping the recorded video 10 can be acquired by the intelligence processing unit 4 by executing an executable code, and the use of the artificial intelligences is not necessary.

Figure 6A:
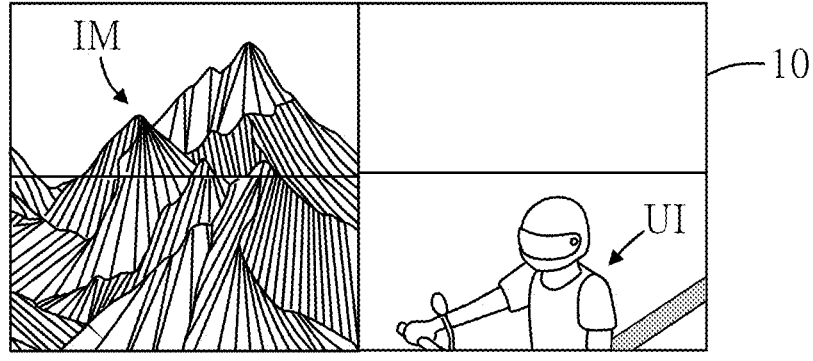
FIG. 6A and FIG. 6B are schematic diagrams of recorded videos cropped with an image of a user and an image of a scenic spot as a compositional subject by an electronic device according to the first embodiment of the present disclosure.
Figure 6B:
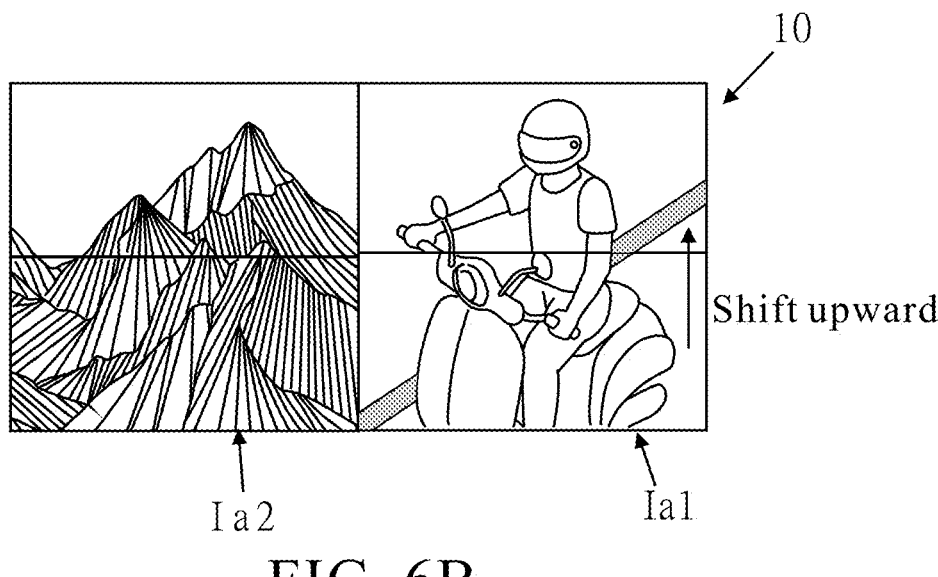

The intelligence processing unit 4 includes an image capturing module 41, an image post-production module 42 and an operating interface module 43. The image capturing module 41 captures a first image region Ia1 where the user image UI is located from the initial video 11 and captures a second image region Ia2 where the scenic spot image IM is located from the initial video 11. The recorded video 10 is a composite image locked with the first image region Ia1 and the second image region Ia2, and includes only the user image UI currently using the transportation vehicle T and the scenic spot image IM. The image post-production module 42 automatically performs image post-production on the recorded video 10 by means of artificial intelligence, wherein the image post-production includes scaling, position balancing (as shown in FIG. 6A and FIG. 6B) and/or noise removal to generate the recorded image as shown in FIG. 6B. The operating interface module 43 is operable to provide a consumer with activation/subscription/viewing of customized riding experience services and vehicle control.

Figure 2:
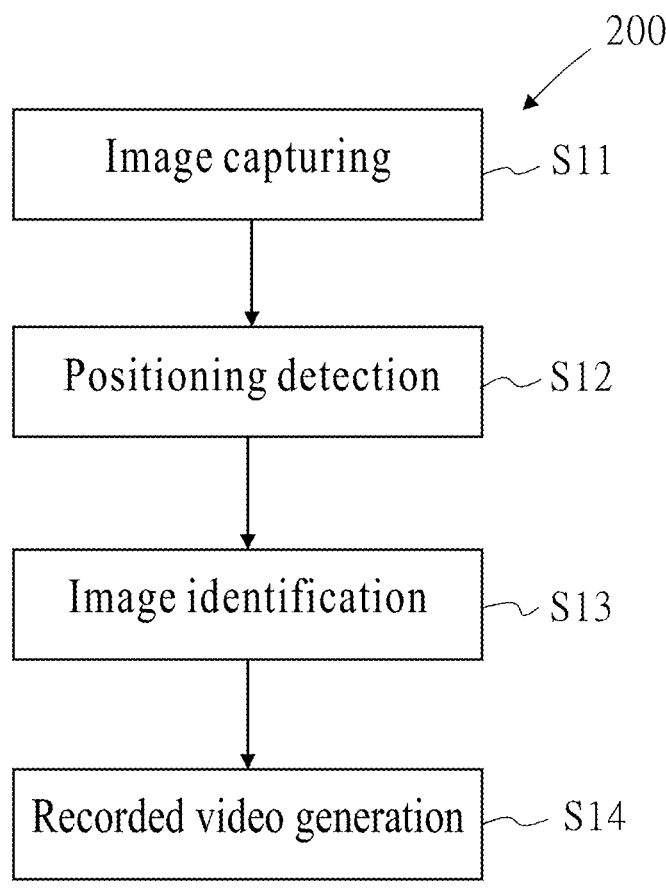
FIG. 2 is steps in a flowchart of an image processing method for assisting a driver in recording images according to a specific embodiment of the present disclosure.

As shown in FIG. 2, the image processing method 200 includes: image capturing of the panoramic camera unit 1 capturing the initial video 11 (step S11); positioning detection of the positioning unit 2 detecting the real-time location 21 of the transportation vehicle T and determining a direction of travel (S12); image identification of the intelligence processing unit 4 identifying the user image UI by means of artificial intelligence, and reading scenic spot information 31 of a scenic spot location from the database 3 to identify the scenic spot image IM to be locked at the scenic spot location P1 (step S13); and recorded video generation of the intelligence processing unit 4 determining, according to the real-time location 21 and the direction of travel, the viewing range R1 of the transportation vehicle T entering the scenic spot location P1 so as to capture a time range from the initial video 11 when the transportation vehicle T is within the viewing range R1, and cropping the recorded video 10 with the user image UI and the scenic spot image IM as a compositional subject according to the time period (step S14). The image processing method 200 is performed by the electronic device 100 reading a plurality of executable codes. In one embodiment, the plurality of executable codes can be stored in a non-transitory computer-readable recording medium, so that the electronic device 100 is to able to read from the non-transitory computer-readable recording medium and then execute these executable codes to perform the operations of generating the recorded video 10.

Specific embodiments are given below according to the implementation details of embodiment above.

FIG. 4, FIG. 5, FIG. 6A and FIG. 6B show schematic diagrams of the electronic device 100 performing the image processing method 200 to generate the recorded video 10 according to a first embodiment of the present disclosure. The panoramic camera unit 1 captures the initial video 11, and the intelligence processing unit 4 determines, according to the real-time location 21 and the direction of travel, whether the transportation vehicle T enters the viewing range R of the scenic spot location P1. Next, when a result of the determination is yes (for example, the real-time location 21 matches one scenic spot location P1 in the user-defined scenic sport information 31, and the travel of direction is headed toward this scenic spot location 31), the image capturing module 41 captures a time period (a user-defined predetermined time period) of the transportation vehicle T within the viewing range R1 from the initial video 11, and crops the recorded video 10 with the user image UI and the scenic spot image IM as a compositional subject from the time period of the initial video 11. Further speaking, the operations above include the intelligence processing unit 4 identifying the user image UI and the identifying the scenic spot image IM to be locked at the scenic spot location P1 by means of artificial intelligence, the image capturing module 41 capturing the first image region Ia1 where the user image UI is located and the second image region Ia2 where the scenic spot image IM is located from the initial video 11, and generating a composite image (referring to FIG. 6A) according to images of the first image region Ia1 and the second image region Ia2 as the recorded video 10. Lastly, the image post-production module 42 performs image post-production on the recorded video 10 by means of artificial intelligence, for example, shifting the position of the recorded video shown in FIG. 6A upward, to generate the recorded video 10 having undergone post-production as shown in FIG. 6B, so as to provide the user with a more comprehensive and enriched picture with an optimal view. Moreover, the image processing method 200 determines according to the scenic spot information 31 predefined by different users whether to capture a video. Thus, recording requirements of different users can be fulfilled, thereby providing users with customized riding experience services.

Figures 7A, 7B, 7C:
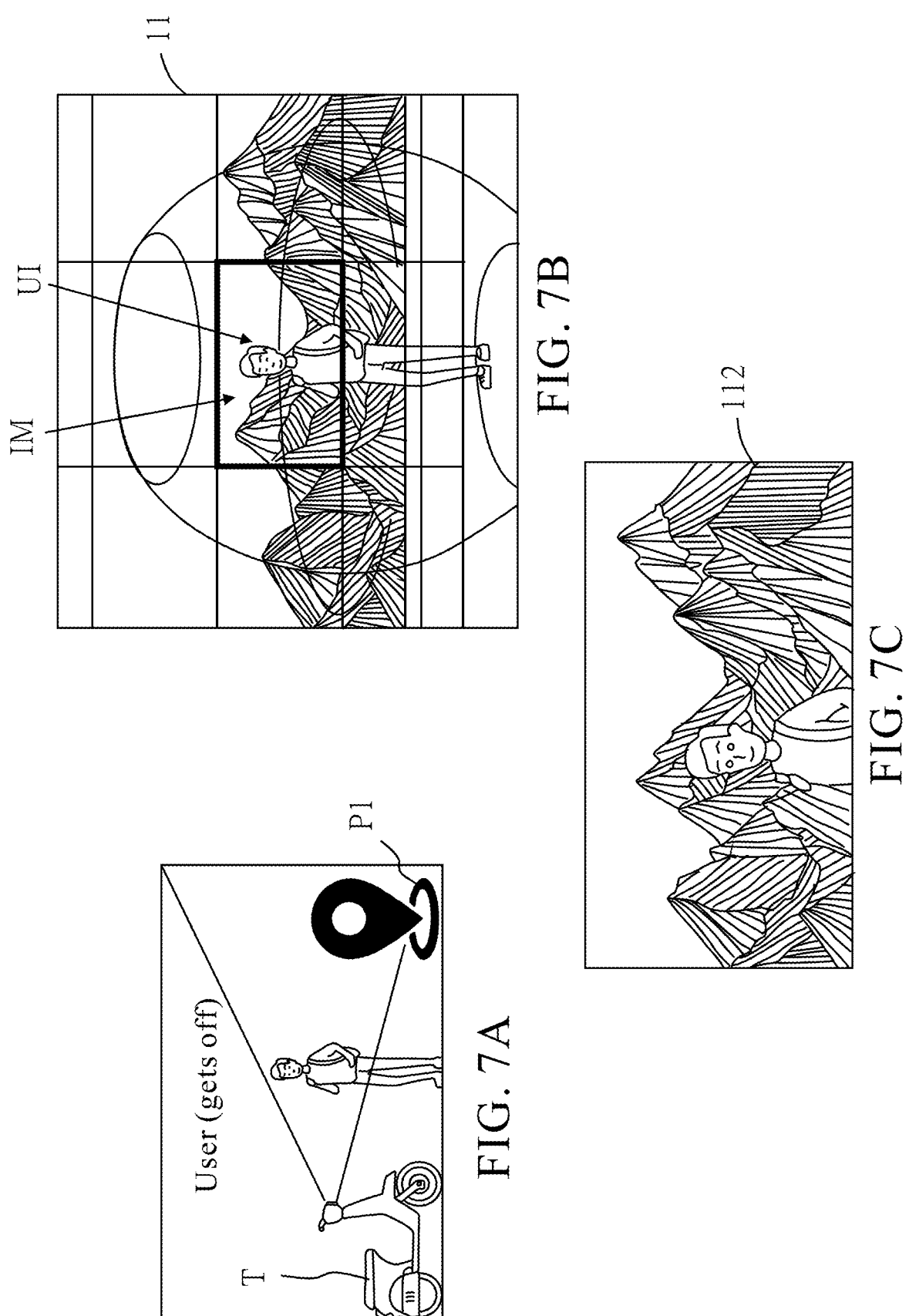
FIG. 7A to FIG. 7C are schematic diagrams of selected pictures generated by an electronic device according to a second embodiment of the present disclosure.

FIG. 7A, FIG. 7B and FIG. 7C show schematic diagrams of an electronic device (referring to FIG. 1) performing the image processing method 200 (referring to FIG. 2) to generate a selected picture 112 according to a second embodiment of the present disclosure. The panoramic camera unit 1 captures the initial video 11, and the intelligence processing unit 4 determines, according to the real-time location 21 and the direction of travel, whether the transportation vehicle T enters the viewing range R of the scenic spot location P1. When a result of the determination is yes and the user leaves the transportation vehicle T (for example, the intelligence processing unit 4 identifies by means of artificial intelligence that the user leaves the transportation vehicle T from the initial video 11), the image capturing module 41 identifies by means of artificial intelligence the scenic spot image IM to be locked in the initial video 11, at the same time identifies and tracks the user image UI, and when the user is at a viewing position with respect to the scenic spot image IM and matches the compositional subject, automatically finds a view in an image corresponding to a current time and captures a selected picture 112 from the initial video 11 (for example, a selected video or picture combining the user getting off the vehicle and the scenic spot).

It should be noted that, the image capturing module 41 can automatically perform face recognition on the user by means of artificial intelligence (for example, by using a deep learning model), and the intelligence processing unit 4 can calculate an optimal viewing angle according to relative positions of a standing area of the user and the scenic spot to control the panoramic camera unit 1 for image capturing, so that the selected picture 112 captured by the image capturing module 41 from the initial video 11 has an optimal view. Moreover, if the background in the initial video 11 has too many passers-by or other objects not related to the user or the scenic spot, the image post-production module 42 performs post-production on the image corresponding to the current time in the initial video 11, wherein the post-production includes image quality optimization and noise removal, so that the selected picture 112 has an optimal picture, further providing the user with more enriched image capturing experience at a fixed scenic spot.

The configuration of an electronic device according to a third embodiment of the present disclosure is the same as that of the electronic device 100 in FIG. 1, and associated details are to be described with reference to FIG. 1 below. The third embodiment is similar to the first embodiment, and the electronic device 100 of the third embodiment differs from the first embodiment in that, the positioning unit 2 is operable to detect the real-time location 21 of the transportation vehicle T currently used by user. The database 3 stores solar information (not shown), which includes a sunrise time and/or a sunset time. The intelligence processing unit 4 receives the initial video 11, identifies the user image UI (that is, an image of the user) by means of artificial intelligence, and identifies a sun image Si of sunrise and/or sunset. The intelligence processing unit 4 is electrically connected to the database 3 to read the solar information, captures a time period of a time range of the sunrise time and/or the sunset time (that is, the time of duration of the sunrise and/or the sunset) within the time range from the initial video 11 according to the real-time location 21 of the transportation vehicle T and the direction of travel, and crops the recorded video 10 with the user image UI and the sun image Si as a compositional subject according to the time period. The recorded video 10 is a selected video of sunrise/sunset during riding of the user.

As shown in FIG. 2, operations of the image processing method 200 performed by the electronic device 100 to generate the recorded video 10 according to a third embodiment of the present disclosure include: image capturing of the panoramic camera unit 1 capturing the initial video (step S11); positioning detection of the positioning unit 2 detecting the real-time location 21 of the transportation vehicle T and determining a direction of travel (S12); image identification of the intelligence processing unit 4 identifying the user image UI by means of artificial intelligence, and reading the solar information including the sunrise time and/or the sunset time from the database 3 to identify the sun image Si at sunrise and/or sunset (step S13); and recorded video generation of the intelligence processing unit 4 capturing a time period of the time range of the sunrise time and/or the sunset time within the time range from the initial video 11, and cropping the recorded video 10 with the user image UI and the sun image Si as a compositional subject according to the time period (step S14).

Specific embodiments are given below according to the implementation details of embodiment above.

Figures 8A, 8B:
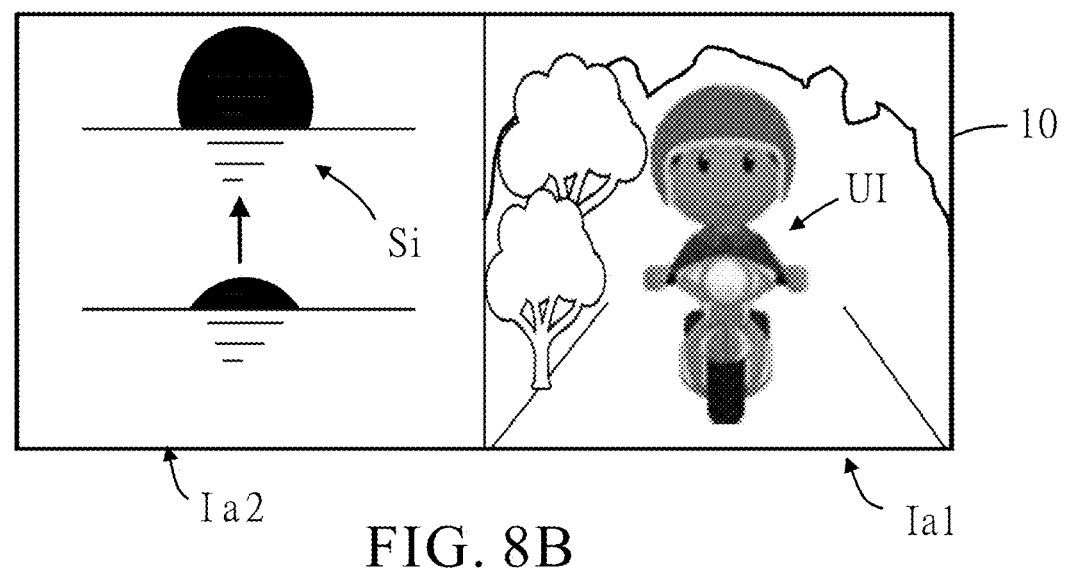
FIG. 8A and FIG. 8B are schematic diagrams of recorded videos cropped with an image of a user and an image of the sun as a compositional subject by an electronic device and showing a rising sun according to a third embodiment of the present disclosure.

FIG. 8A and FIG. 8B show schematic diagrams of the electronic device 100 (referring to FIG. 1) performing the image processing method 200 (referring to FIG. 2) to generate the recorded video 10 according to the third embodiment of the present disclosure. In the third embodiment, element names and terms similar to those of the first embodiment are represented by the same numerals or symbols in FIG. 8A and FIG. 8B. The panoramic camera unit 1 captures the initial video 11, and the positioning unit 2 detects the real-time location 21 of the transportation vehicle T and determines a direction of travel (for example, determining the direction and the speed of travel of the transportation vehicle T by GPS to provide more accurate direction and speed of travel with the use of a six-axis sensor). Next, the intelligence processing unit 4 identifies the user image UI from the initial video 11 by means of artificial intelligence, and identifies according to the solar information that the sun is related to the sun image Si at sunrise. More specifically, the solar information includes the position of the sun defined by an elevation angle and an azimuth angle, and the sun is at a rising position herein. The intelligence processing unit 4 calculates the position of the sun in the initial video 11 according to the elevation angle and the azimuth angle of the position of the sun within the time range of the sunrise time, so as to obtain the sun image Si when the sun rises. Then, according to the real-time location 21 and the direction of travel (from south to north) of the transportation vehicle T, the intelligence processing unit 4 captures a time period of the time range of the sunrise time within the time range from the initial video 11. The image capturing module 41 captures the first image region Ia1 where the user image UI is located and the second image region Ia2 where the sun image Si is located from the time period from the initial video 11, and performs image composition (referring to FIG. 8B) according to images of the first image region Ia1 and the second image region Ia2, such that the recorded video 10 includes only the user image UI (including road trees and mountains in FIG. 8A and FIG. 8B) when the transportation vehicles T is being used, and the sun image Si at sunrise (including the horizon in FIG. 8A and FIG. 8B). Lastly, the image post-production module 42 performs image post-production on the recorded video 10 by means of artificial intelligence, wherein the image post-production includes scaling, position balancing and/or noise removal, so that the user can acquire a more comprehensive and enriched picture with an optimal view.

Figure 9A:
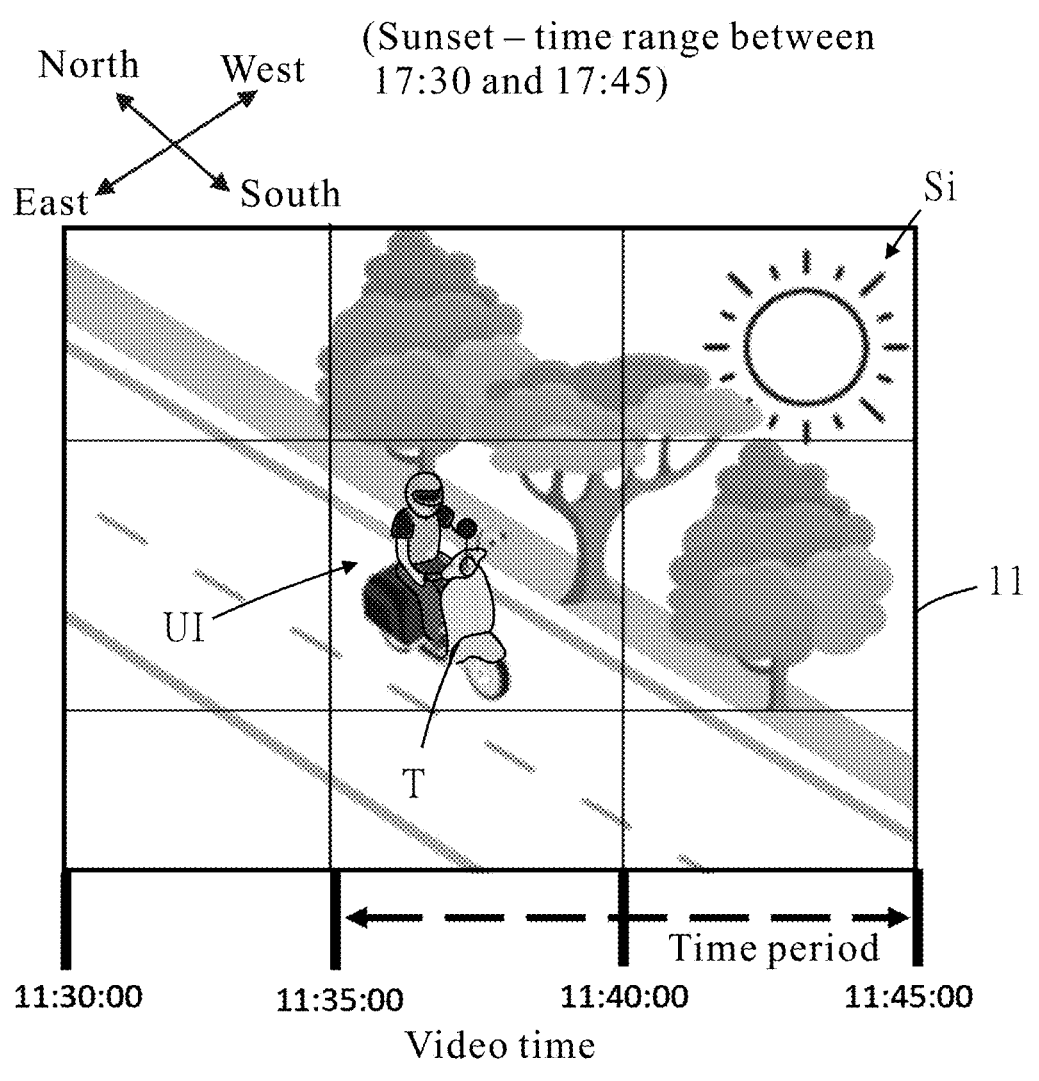
FIG. 9A and FIG. 9B are schematic diagrams of recorded videos cropped with an image of a user and an image of the sun as a compositional subject by an electronic device and showing a falling sun according to a third embodiment of the present disclosure.
Figure 9B:
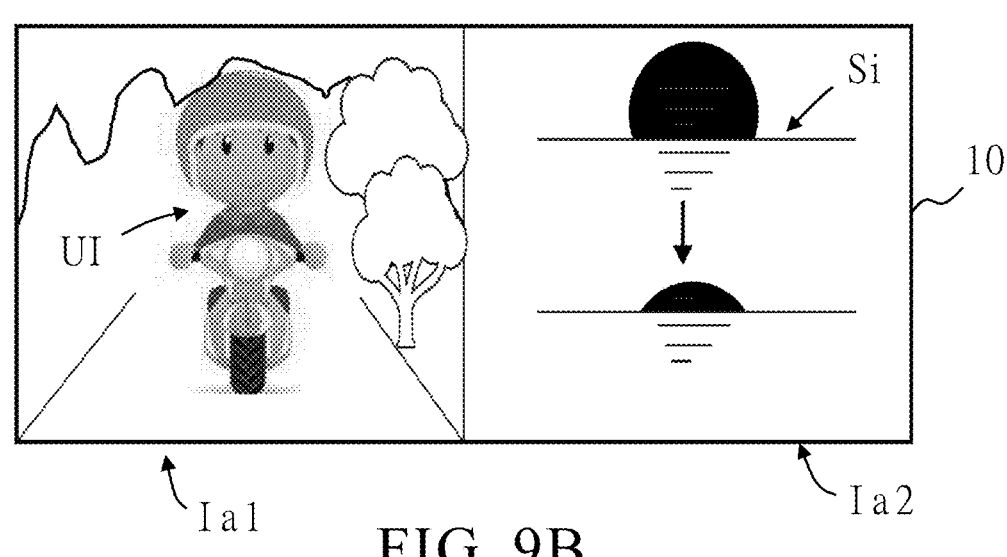

FIG. 9A and FIG. 9B show other schematic diagrams of the electronic device 100 performing the image processing method 200 to generate the recorded video 10 according to the third embodiment of the present disclosure. FIGS. 9A and 9B are similar to FIGS. 8A and 8B, and differ in that the solar information includes the position of the sun defined by an elevation angle and an azimuth angle, and the sun is at a falling position herein. The intelligence processing unit 4 calculates the position of the sun in the initial video 11 according to the elevation angle and the azimuth angle of the position of the sun within the time range of the sunset time, so as to obtain the sun image Si when the sun falls. Then, the intelligence processing unit 4 captures a time period of the time range of the sunset time within the time range from the initial video 11 according to the real-time location 21 and the direction of travel (from north to south) of the transportation vehicle T, and then the image capturing module 41 crops the recorded video 10 with the user image UI and the sun image Si as a compositional subject from the time period, for the image post-production module 42 to perform image post-production.

It should be noted that, the means for the intelligence processing unit 4 to obtain the sun image Si is not limited to according to the solar information. In other embodiments, the intelligence processing unit 4 identifies the position of the sun in the initial video 11 within the time range of the sunrise time or the sunset time according to brightness in the initial video 11 (for example, identifying the sun via brightness in the image), so as to obtain the sun image Si.

Figures 10A, 10B, 11A, 11B:
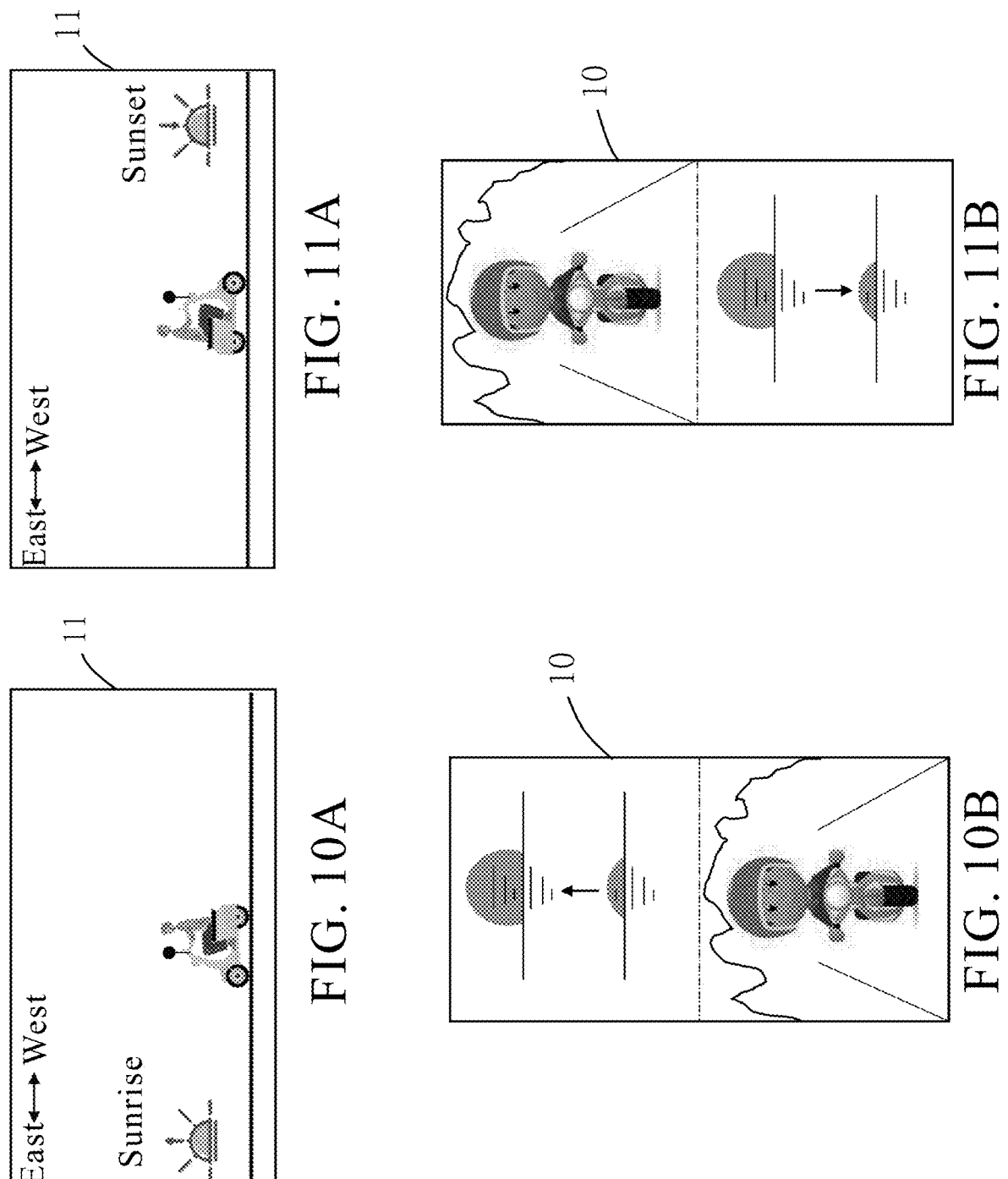
FIG. 10A and FIG. 10B are other schematic diagrams of recorded videos cropped with an image of a user and an image of the sun as a compositional subject by an electronic device and showing a rising sun according to the third embodiment of the present disclosure.
FIG. 11A and FIG. 11B are other schematic diagrams of recorded videos cropped with an image of a user and an image of the sun as a compositional subject by an electronic device and showing a falling sun according to the third embodiment of the present disclosure.

FIG. 10A and FIG. 10B show yet other schematic diagrams of the electronic device 100 performing the image processing method 200 to generate the recorded video 10 according to the third embodiment of the present disclosure. The positioning unit 2 detects the real-time location 21 of the transportation vehicle T and determines that the direction of travel (for example, determining the direction of travel and the speed of the transportation vehicle T) is a direction from west to east toward the sunrise. At this point, in the recorded video with the user image Ui and the sun image Si as the compositional subject and cropped by the image capturing module 41 from the time period, the user image UI is located at a lower part of the recorded video 10 and the sun image Si is located at an upper part of the recorded video 10. FIG. 11A and FIG. 11B show yet other schematic diagrams of the electronic device 100 performing the image processing method 200 to generate the recorded video 10 according to the third embodiment of the present disclosure. The positioning unit 2 detects the real-time location 21 of the transportation vehicle T and determines that the direction of travel is a direction from east to west toward the sunset. At this point, in the recorded video with the user image Ui and the sun image Si as the compositional subject and cropped by the image capturing module 41 from the time period, the user image UI is located at an upper part of the recorded video 10 and the sun image Si is located at a lower part of the recorded video 10. Thus, from the recorded video 10, the user can further learn his/her direction relationship with respect to the sun.

It is clearly seen from the description that, the present disclosure is characterized in that, during the process of the user driving/riding the transportation vehicle T, with the electronic device 100 and by performing the image processing method 200 of the present disclosure, the recorded video 10 can be automatically captured from the initial video 11. For example, in a scenario of riding the transportation vehicle T passing by the scenic spot location P1 as in the first embodiment, according to the scenic spot information 31 predetermined by the user, the process of the user passing by the scenic spot location P1 can be automatically cropped from the initial video 11 into the recorded video 10 with the user image UI and the scenic spot image IM as the compositional subject. Alternatively, in a scenario of the sunrise and the sunset as in the third embodiment, the sun image Si can be acquired according to the solar information or image brightness information, the user image UI and the sun image Si can be locked in the initial video 11 and the recorded video 10 can be automatically cropped, thereby recording the process of the user riding the transportation vehicle T accompanied with the sunrise or the sunset. As such, the recorded video 10 is automatically generated by the electronic device 100 performing the image processing method 200, and the user is not required to carry out any editing or post-production on the initial video 11 during such process. Thus, the requirement of recording a riding process can be fulfilled during the process of the riding experience of the user, so as to promote customized services for recording the riding experience of the user.

Moreover, as described in the first, second and third embodiments, the image post-production module 42 is capable of automatically performing post-production on the recorded video 10, thereby providing the user with a more comprehensive and enriched optimal picture.

In addition, with the image processing method 200 performed by the electronic device 100 of the present disclosure, as in the scenario of the user leaving the transportation vehicle T as in the second embodiment, the intelligence processing unit 4 can further calculate the optimal viewing angle of the user and the scenic spot, so as to automatically find a view in the image corresponding to a current time from the initial video 11, further enabling the image capturing module 41 to capture the selected picture 112 with the optimal view from the initial video 11. As such, when the user leaves the transportation vehicle T and is to perform fixed-point image capturing at the scenic spot, with the electronic device 100 and the image processing method 200 of the present disclosure, merged picture experience services with an enriched compositional subject can be automatically provided.

The present invention is described by way of the preferred embodiments above. A person skilled in the art should understand that, these embodiments are merely for describing the present invention are not to be construed as limitations to the scope of the present invention. It should be noted that all equivalent changes, replacements and substitutions made to the embodiments are to be encompassed within the scope of the present invention. Therefore, the scope of protection of the present invention should be accorded with the broadest interpretation of the appended claims.

While the present disclosure has been described by means of specific embodiments, numerous modifications and variations could be made thereto by those skilled in the art without departing from the scope and spirit of the present disclosure set forth in the claims.

What is claimed is:

1. An electronic device for assisting a driver in recording images, adapted to assist a user to record images during a usage process of a transportation vehicle, the electronic device comprising:

a panoramic camera unit, installed on the transportation vehicle to capture an initial video presenting a panoramic image of a location of the transportation vehicle;

a positioning unit, operable to detect a real-time location of the transportation vehicle;

a database, storing scenic spot information comprising a plurality of scenic spot locations; and an intelligence processing unit, electrically connected to the panoramic camera unit to receive the initial video, identifying an image of the user by means of artificial intelligence, and identifying an image of a scenic spot to be locked at the scenic spot location; the intelligence processing unit further electrically connected to the positioning unit to receive the real-time location, and determining a direction of travel; the intelligence processing unit further electrically connected to the database to read the scenic spot information, determining, according to the real-time location and the direction of travel, a viewing range of the transportation vehicle entering one of the scenic spot locations so as to capture a time period of the transportation vehicle within the viewing range from the initial video, and cropping a recorded video with the image of the user and the image of the scenic spot as a compositional subject according to the time period.

2. The electronic device for assisting a driver in recording images according to claim 1, wherein the intelligence processing unit comprises an image capturing module, and captures a first image region where the image of the user is located and a second image region where the image of the scenic spot is located from the initial video by the image capturing module, wherein the recorded video is a composite image locked with the first image region and the second image region, and comprises only the image of the user currently using transportation vehicle and the image of the scenic spot.

3. The electronic device for assisting a driver in recording images according to claim 2, wherein the intelligence processing unit comprises:

an image post-production module, automatically performing image post-production on the recorded video by means of artificial intelligence, wherein the image post-production comprises scaling, position balancing and/or noise removal.

4. The electronic device for assisting a driver in recording images according to claim 1, wherein when the transportation vehicle enters the viewing range and the user leaves the transportation vehicle, the image capturing module identifies by means of artificial intelligence the image of the scenic spot to be locked in the initial video, at the same time identifies and tracks the image of the user, and when the user is at a viewing position with respect to the image of the scenic spot and matches the compositional subject, automatically finds a view in an image corresponding to a current time and captures a selected picture from the initial video.

5. An electronic device for assisting a driver in recording images, adapted to assist a user to record images during a usage process of a transportation vehicle, the electronic device comprising:

a panoramic camera unit, installed on the transportation vehicle to capture an initial video presenting a panoramic image of a location of the transportation vehicle;

a positioning unit, operable to detect a real-time location of the transportation vehicle currently used by the user;

a database, storing solar information comprising a sunrise time and/or a sunset time; and an intelligence processing unit, electrically connected to the panoramic camera unit to receive the initial video, identifying an image of the user by means of artificial intelligence, and identifying an image of the sun at sunrise and/or at sunrise; the intelligence processing unit further electrically connected to the positioning unit to receive the real-time location of the transportation vehicle, and determining a direction of travel; the intelligence processing unit further electrically connected to the database to read the solar information, capturing a time period of a time range of the sunrise time and/or the sunset time within the time range from the initial video, and cropping a recorded video with the image of the user and the image of the sun as a compositional subject according to the time period.

6. The electronic device for assisting a driver in recording images according to claim 5, wherein the intelligence processing unit comprises an image capturing module, and captures a first image region where the image of the user is located and a second image region where the sun is located from the initial video by the image capturing module, wherein the recorded video is an image composition locked with the first image region and the second image region, and comprises only the image of the user currently using the transportation vehicle and the image of the sun.

7. The electronic device for assisting a driver in recording images according to claim 6, wherein the intelligence processing unit comprises:

an image post-production module, automatically performing image post-production on the recorded video by means of artificial intelligence, wherein the image post-production comprises scaling, position balancing and/or noise removal.

8. The electronic device for assisting a driver in recording images according to claim 5, wherein the solar information comprises a position of the sun defined by an elevation angle and an azimuth angle, and the intelligence processing unit calculates a position of the sun in the initial video within the time range of the sunrise time and/or the sunset time according to the elevation angle and the azimuth angle of the position of the sun, so as to obtain the image of the sun.

9. The electronic device for assisting a driver in recording images according to claim 5, wherein the intelligence processing unit identifies a position of the sun in the initial video within the time range of the sunrise time and/or the sunset time according to brightness in the initial video, so as to obtain the image of the sun.

10. An image processing method for assisting a driver in recording images, performed by an electronic device reading an executable code, adapted to assist a user to record images during a usage process of a transportation vehicle, the image processing method comprising the following steps:

image capturing of capturing an initial video presenting a panoramic image of a location of the transportation vehicle;

positioning detection of detecting a real-time location of the transportation vehicle and determining a direction of travel;

image identification of identifying an image of the user by means of artificial intelligence and reading scenic spot information of a scenic spot location from a database, so as to identify an image of a scenic spot to be locked at the scenic spot location; and recorded video generation of determining, according to the real-time location and the direction of travel, a viewing range of the transportation vehicle entering the scenic spot location to capture a time period of the transportation vehicle within the viewing range from the initial video, and cropping a recorded video with the image of the user and the image of the scenic spot as a compositional subject according to the time period.

11. The image processing method according to claim 10, wherein in the step of recorded video generation, a first image region where the image of the user is located is captured and a second image region where the image of the scenic spot is located is captured from the initial video, wherein the recorded video is an image composition locked with the first image region and the second image region, and comprises only the image of the user currently using the transportation vehicle and the image of the scenic spot.

12. The image processing method according to claim 11, wherein when the transportation vehicle enters the viewing range and the user leaves the transportation vehicle, the step of image identification comprises identifying by means of artificial intelligence the image of the scenic spot to be locked in the initial video and at the same time identifying and tracking the image of the user, and when the user is at a viewing position with respect to the image of the scenic spot and matches the compositional subject, automatically finding a view in an image corresponding to a current time and capturing a selected picture from the initial video.

13. An image processing method for assisting a driver in recording images, performed by an electronic device reading an executable code, adapted to assist a user to record images during a usage process of a transportation vehicle, the image processing method comprising the following steps:

image capturing of capturing an initial video presenting a panoramic image of a location of the transportation vehicle;

positioning detection of detecting a real-time location of the transportation vehicle and determining a direction of travel;

image identification of identifying an image of the user by means of artificial intelligence and reading solar information comprising a sunrise time and/or a sunset time from a database, so as to identify an image of the sun at sunrise and/or at sunset; and recorded video generation of capturing a time period of a time range of the sunrise time and/or the sunset time within the time range from the initial video, and cropping a recorded video with the image of the user and the image of the sun as a compositional subject according to the time period.

14. The image processing method according to claim 13, wherein in the step of recorded video generation, a first image region where the image of the user is located is captured and a second image region where the image of the sun is located is captured from the initial video, wherein the recorded video is an image composition locked with the first image region and the second image region, and comprises only the image of the user currently using the transportation vehicle and the image of the sun.

15. The image processing method according to claim 13, the solar information comprises a position of the sun defined by an elevation angle and an azimuth angle, and in the step of image identification, a position of the sun in the initial video within the time range of the sunrise time and/or the sunset time is calculated according to the elevation angle and the azimuth angle of the position of the sun, so as to obtain the image of the sun.

16. The image processing method according to claim 13, wherein in the step of image identification, a position of the sun in the initial video within the time range of the sunrise time and/or the sunset time is identified according to brightness in the initial video, so as to obtain the image of the sun.

17. A non-transitory computer-readable recording medium, storing an application comprising a plurality of executable codes, for an electronic device to perform the method according to claim 10 when the executable codes are read by the electronic device.

18. A non-transitory computer-readable recording medium, storing an application comprising a plurality of executable codes, for an electronic device to perform the method according to claim 13 when the executable codes are read by the electronic device.

* * * * *